(12) United States Patent
Okamoto

(10) Patent No.: US 8,581,465 B2
(45) Date of Patent: Nov. 12, 2013

(54) GENERATOR

(75) Inventor: Tetsuo Okamoto, Ehime (JP)

(73) Assignee: Koueidenshi Corporation, Tokyo (JP)

( * ) Notice: Subject to any disclaimer, the term of this patent is extended or adjusted under 35 U.S.C. 154(b) by 346 days.

(21) Appl. No.: 13/128,331

(22) PCT Filed: Nov. 20, 2008

(86) PCT No.: PCT/JP2008/071146
§ 371 (c)(1),
(2), (4) Date: Jul. 22, 2011

(87) PCT Pub. No.: WO2010/052801
PCT Pub. Date: May 14, 2010

(65) Prior Publication Data
US 2011/0298328 A1  Dec. 8, 2011

(30) Foreign Application Priority Data
Nov. 10, 2008  (JP) .................. 2008-288112

(51) Int. Cl.
*H02K 16/00* (2006.01)
(52) U.S. Cl.
USPC ............. 310/156.36; 310/198; 310/156.37; 310/112; 310/114; 310/268
(58) Field of Classification Search
USPC ........ 310/112, 114, 156.36, 156.37, 198, 268
See application file for complete search history.

(56) References Cited

U.S. PATENT DOCUMENTS

| | | | |
|---|---|---|---|
| 5,977,684 A * | 11/1999 | Lin | 310/268 |
| 2004/0135452 A1* | 7/2004 | Tu et al. | 310/156.32 |
| 2005/0140234 A1* | 6/2005 | Okamoto | 310/156.37 |
| 2009/0096310 A1* | 4/2009 | Takeuchi | 310/156.36 |
| 2011/0273046 A1* | 11/2011 | Okamoto | 310/154.45 |

FOREIGN PATENT DOCUMENTS

| | | |
|---|---|---|
| JP | 2006-187194 | 7/2006 |
| JP | 4085128 B1 | 2/2008 |
| JP | 2010-172048 * | 8/2010 |

* cited by examiner

*Primary Examiner* — John K Kim
*Assistant Examiner* — Rohit Singh
(74) *Attorney, Agent, or Firm* — Rabin & Berdo, P.C.

(57) ABSTRACT

A generator comprises: a stator plate having a first fixed permanent magnet including a plurality of magnets on one side and a second fixed permanent magnet including a plurality of magnets on the other side; a first armature having a first switching winding, a first output winding, and a first back-electromotive force prevention winding on a fixed first ring core; a second armature having a second switching winding, a second output winding, and a second back-electromotive force prevention winding on a fixed second ring core; a first rotor plate having a first rotary permanent magnet; and a second rotor plate having a second rotary permanent magnet. The first and second rotor plates are coupled to each other by a driving shaft.

8 Claims, 10 Drawing Sheets

Fig.4
Fig. 4a
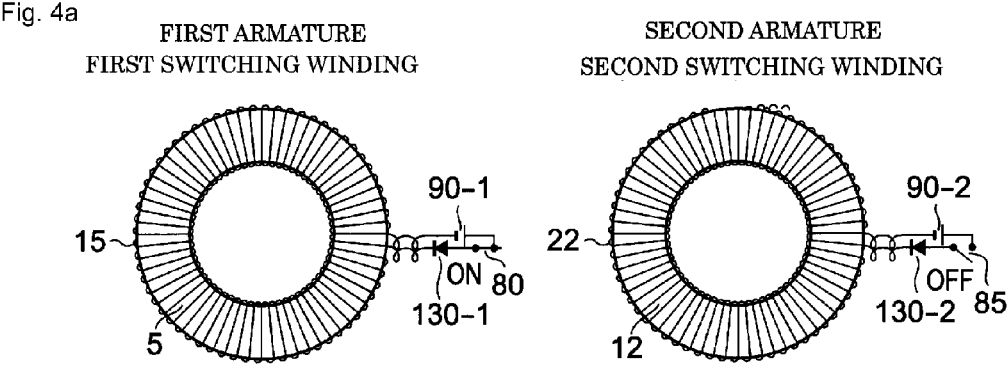
Fig. 4b
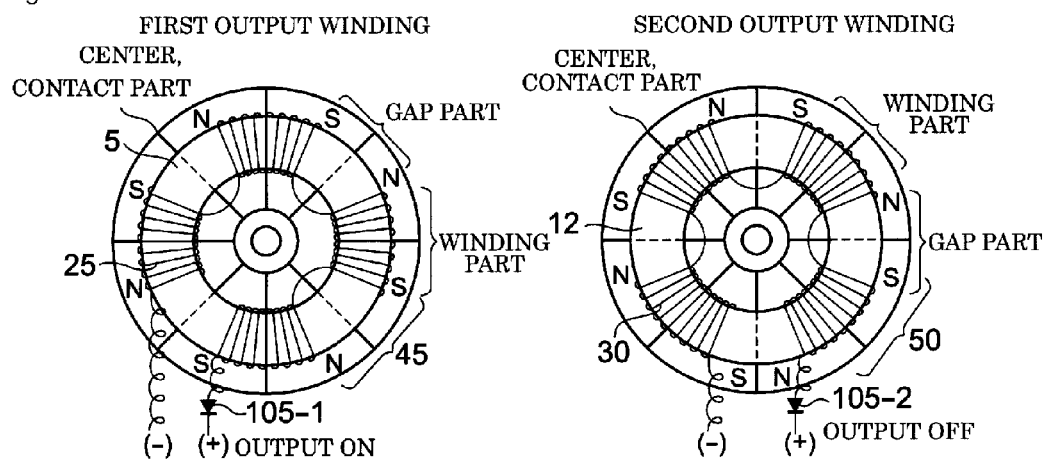
Fig. 4c
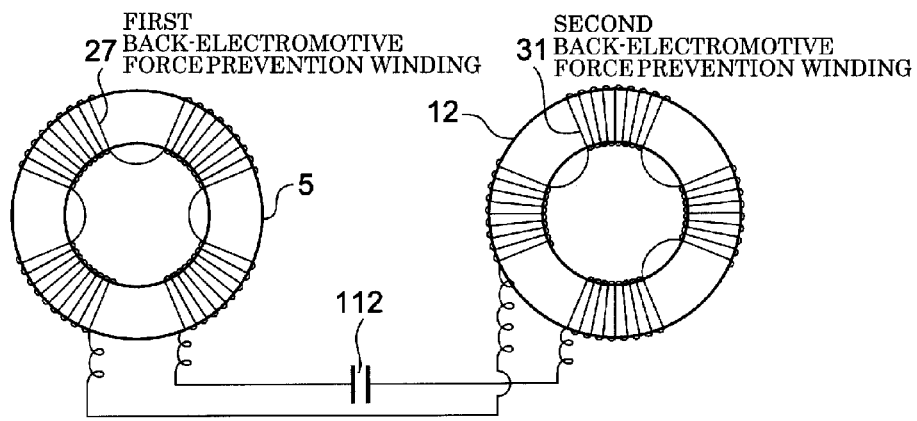

Fig.7
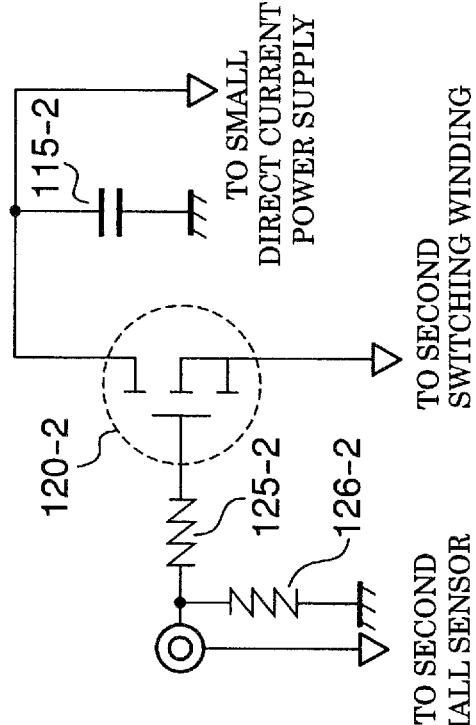
Fig. 7b
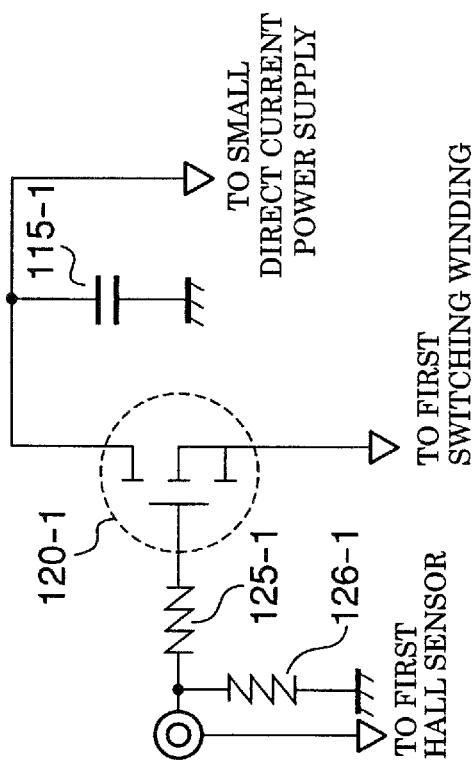
Fig. 7a

Fig.10
PRIOR ART
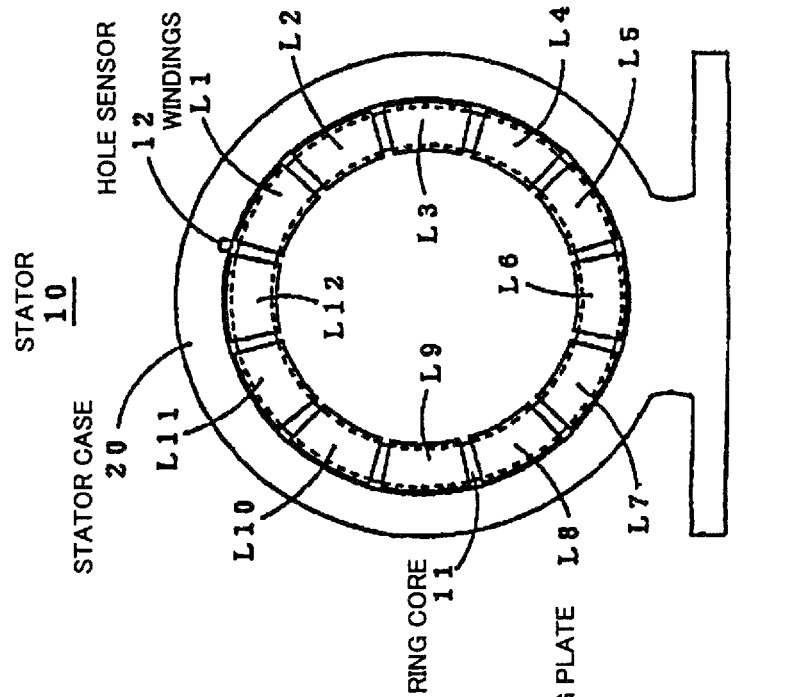
Fig. 10b
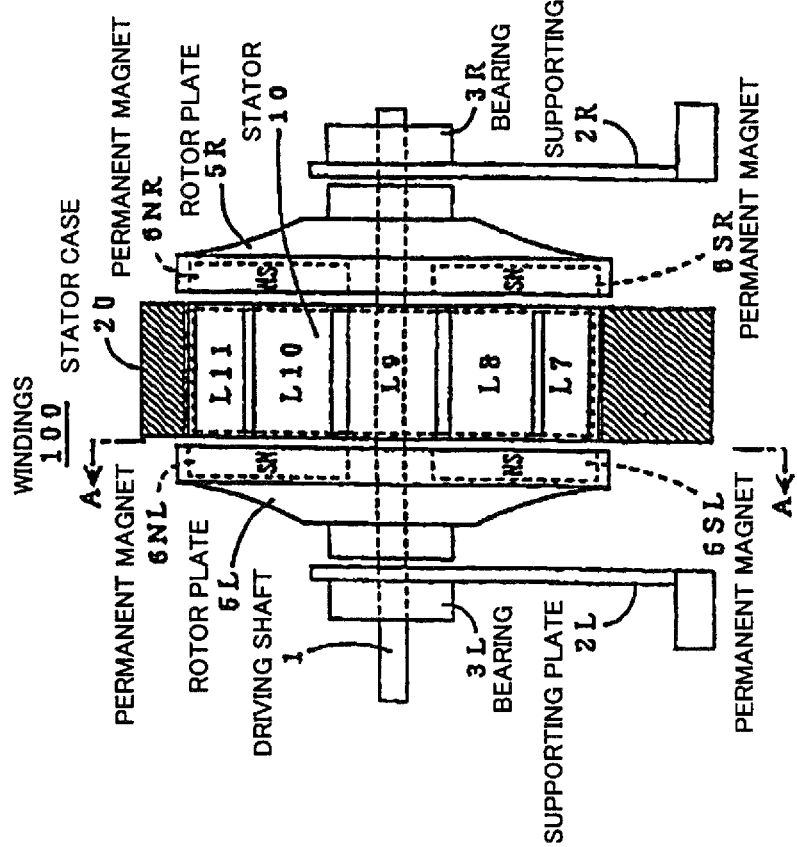
Fig. 10a

GENERATOR

TECHNICAL FIELD

The present invention relates to a generator which generates electricity by rotating permanent magnets with rotational forces applied from outside. More specifically, the present invention relates to a generator, the power generation efficiency of which is further improved by employing a configuration in which a power generation mechanism is divided into two independent mechanisms to prevent back-electromotive force and enhance the rotational driving force.

BACKGROUND ART

Patent Document 1 describes a generator which generates electricity by rotating permanent magnets with rotational forces applied from outside. In FIG. 10a, the generator (100) includes a left rotor plate (5L) and a right rotor plate (5R) on both sides of a stator (10) held by a stator case (20). A semicircular permanent magnet (6NL) magnetized in the direction opposite to the stator (10) is adhered to the left rotor plate (5L) in such a manner that the North pole faces toward the stator (10). A semicircular permanent magnet (6SL) magnetized in the direction opposite to the stator (10) is adhered to the left rotor plate (5L) in such a manner that the South pole faces toward the stator (10). Similarly, a semicircular permanent magnet (6NR) magnetized in the direction opposite to the stator (10) is adhered to the right rotor plate (5R) in such a manner that the North pole faces toward the stator (10). Further, a semicircular permanent magnet (6SR) magnetized in the direction opposite to the stator (10) is adhered to the right rotor plate (5R) in such a manner that the South pole faces toward the stator (10).

In FIG. 10b, the stator (10) comprises a ring core (11) around which windings (L1) to (L12) are troidally wound at equiangular intervals. A hall sensor 12 is provided between the windings (L12) and (L1). In FIG. 11, the windings (L1) to (L6) are connected in series via rectifiers (D1) to (D5). The winding (L6) is connected to a first end of a first TRIAC (T1) via a rectifier (D6). The windings (L7) to (L12) are connected in series via rectifiers (D7) to (D11). The winding (L12) is connected to a first end of a second TRIAC (T2) via a rectifier (D12). The rectifiers (D1 to D12) have storage circuits (H1 to H12), respectively. Second ends of the first and second TRIACs (T1 and T2) are connected to a capacitor (C) via current limiting resistors R1 and R2.

When the left rotor plate (5L) and the right rotor plate (5R) are rotated, the polarity of a magnetic flux detected by the hall sensor (12) is inverted from that of the South pole to that of the North pole so that the first TRIAC (T1) is turned on and the second TRIAC (T2) is turned off. When the left rotor plate (5L) and the right rotor plate (5R) are further rotated, electromotive forces in the forward direction of the rectifiers (D1) to (D6) are produced on the windings (L1) to (L6) so as to charge the storage circuits (H1) to (H6). At this time, the voltages of the storage circuits (H1) to (H6) are added. The capacitor (C) is charged by the voltage of the storage circuit (H6) via the first TRIAC (T1) and the current limiting resistor (R1) to output a direct current from both ends of the capacitor (C).

When the left rotor plate (5L) and the right rotor plate (5R) are further rotated, the polarity of a magnetic flux detected by the hall sensor (12) is inverted from that of the North pole to that of the South pole causing the first TRIAC (T1) to be turned off and the second TRIAC (T2) to be turned on. When the left rotor plate (5L) and the right rotor plate (5R) are further rotated, electromotive forces in the forward direction of the rectifiers (D7) to (D12) are produced on the windings (L7) to (L12) to charge the storage circuits (H7) to (H12), and the voltages of the storage circuits (H7) to (H12) are added. The capacitor (C) is charged by the voltage of the storage circuit (H12) via the second TRIAC (T2) and the current limiting resistor (R2) to output a direct current from both ends of the capacitor (C).

As described above, a magnetic field is generated on the left rotor plate (5L) from the permanent magnets (6NL) to (6SL); a magnetic field is generated on the right rotor plate (5R) in a direction from the permanent magnets (6NR) to (6SR); and the left rotor plate (5L) and the right rotor plate (5R) are rotated to produce in-phase and anti-phase electromotive forces with each other on the windings (L1) to (L6) and the windings (L7) to (L12). There has been a problem that when electricity is being taken out from the windings (L1) to (L6) of the toroidal windings (L1) to (L12) of the ring core (11) of the stator (10), it cannot be taken out from the windings (L7) to (L12).

Also, reverse rotational torque generated by back-electromotive force generated on the windings (L1) to (L6) and the windings (L7) to (L12) reduces rotational torque received by the rotor plates, which causes to lower the electricity generation efficiency.

[Patent Document 1] Japanese Patent No. 3783141

DISCLOSURE OF THE INVENTION

Problems to be Solved by the Invention

The present invention has been made to solve such problems and an object of the present invention is to provide an electric generator, the power generation efficiency of which is further improved by employing a configuration in which a power generation mechanism having a back-electromotive force prevention function is divided into two independent mechanisms, and the phases thereof are completely shifted to each other when generating electric power, thereby strengthening rotary driving force.

Means for Solving the Problems

According to an aspect of the present invention, there is provided a generator including a stator plate having a first fixed permanent magnet consisting of a plural number of magnets on one side thereof and a second fixed permanent magnet consisting of the same number of magnets as the plural number on the other side, the respective plural number of magnets of the first and second fixed permanent magnet being arranged in such a manner that magnetic poles facing each other thereof are opposite, a first armature provided on the side of the first fixed permanent magnet, including a first switching winding wound around a first ring core fixed thereto, a first output winding, and a first back-electromotive force prevention winding, the first output winding including a winding part and a gap part divided into winding sections and gap sections respectively so that the total number of the winding and gap sections are the same as the plural number, each center of the winding and gap sections being aligned with each of contact parts at which the plural number of magnets of the first fixed permanent magnet are in contact with each other, the first back-electromotive force prevention winding being wound on the gap part of the first output winding, a second armature provided on the side of the second fixed permanent magnet, including a second switching winding wound around a second ring core fixed thereto, a second output winding, and a second back-electromotive force prevention winding, the second output winding including a winding part and a gap part divided into winding sections and gap sections respectively so that the total number of the winding and gap sections are the same as the plural number, the winding part and gap part of the second output winding being opposite to the gap part and winding part of the first output winding respectively, each center of the winding sections and gap sections being aligned with each of contact parts at which the plural number of magnets of the second fixed permanent magnet are in contact with each other, the second back-electromotive force prevention winding being wound on the gap part of the second output winding, a first rotor plate facing the first armature and having a first rotational permanent magnet consisting of the same number of magnets as the plural number, and a second rotor plate facing the second armature and having a second rotational permanent magnet consisting of the same number of magnets as the plural number, the magnets being arranged so that magnetic poles thereof facing those of the first rotational permanent magnet are the same, the first and second rotor plates being coupled to each other by a driving shaft. Optionally, the first and second switching windings may include first and second power supplies and first and second switches respectively. Further optionally, one end of the first back-electromotive force prevention winding may be connected with one end of a capacitor. Alternatively, one end of the second back-electromotive force prevention winding may be connected with the other end of the capacitor. Furthermore, the other end of the first back-electromotive force prevention winding and the other end of the second back-electromotive force prevention winding may be connected with each other. Optionally, electromotive force is extracted by operations of the first and second switches based on the timing when the electromotive force is generated on the first and second output windings by rotation of the first and second rotor plates.

Optionally, winding directions of the first and second output windings and the first and second back-electromotive force prevention windings may be the same. Further optionally, the numbers of windings of the first and second output windings are the same. Alternatively, the numbers of windings of the first and second back-electromotive force prevention windings may be the same. Furthermore, the numbers of windings and winding directions of the first and second switching windings may be the same.

Optionally, when the winding directions of the first and second output windings and the first and second switching windings are the same, the first and second switches may be turned on based on the timing when an electromotive force is generated on the first and second output windings, and the first and second power supplies may supply a current in the same direction as a current generated by the electromotive force. Further optionally, when the winding directions of the first and second output windings and the first and second switching windings are opposite, the first and second switches may be turned on based on the timing when an electromotive force is generated on the first and second output windings, and the first and second power supplies may supply a current in the opposite direction to a current generated by the electromotive force.

Optionally, one ends of the first and second output windings may be grounded and the other ends thereof may be connected with positive terminals of first and second rectifiers. Further optionally, negative terminals of the first and second rectifiers may be connected with one end of the capacitor. Alternatively, the other end of the capacitor may be grounded. Preferably, electricity may be extracted from the one end of the capacitor.

Advantageous Effect of the Invention

According to the generator of the present invention, electromotive force generated by a power generation mechanism divided into two independent mechanisms prevents rotational braking effect due to back-electromotive force by each switching winding and back-electromotive force prevention winding. Also, since the electromotive force is output in such a manner that phases thereof are completely shifted, rotational drive power is generated alternately in the two independent power generation mechanisms, which can enhance the rotation of rotor plates. In this way, there can be provided a generator the power generation efficiency of which is further improved.

BRIEF DESCRIPTION OF THE DRAWINGS

FIGS. 4a, 4b and 4c are armature constitutional diagrams showing the constitution of ring cores and windings of the present invention;

FIGS. 7a and 7b are circuit connection wiring diagrams of electronic switches;

FIGS. 10a and 10b are a front cross-sectional diagram and a side diagram showing a stator of the conventional electric power generating apparatus.

DESCRIPTION OF SYMBOLS

Figure 1:
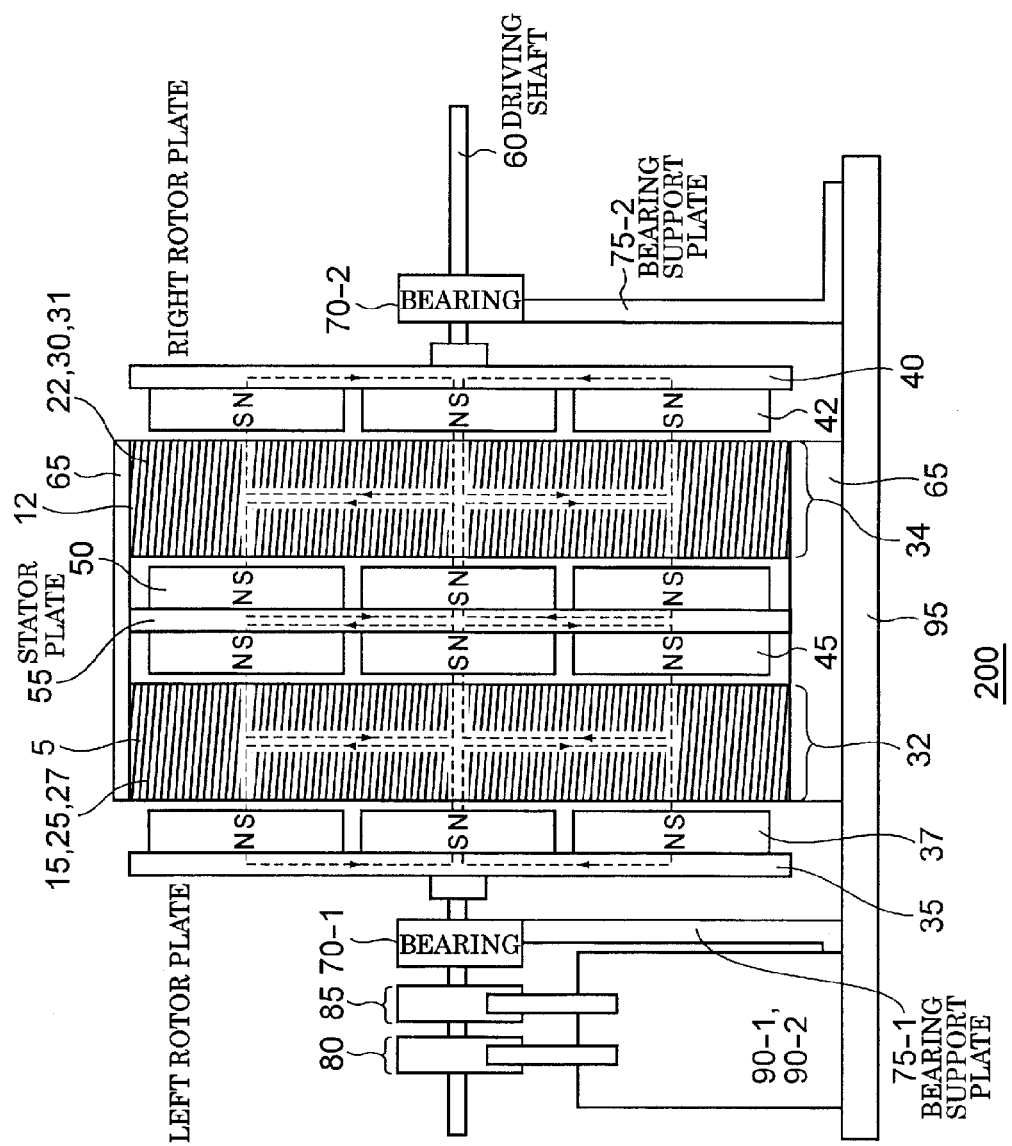
FIG. 1 is a constitutional diagram showing the constitution of a generator of the present invention.

5: first ring core
12: second ring core
15: first switching winding
22: second switching winding
25: first output winding
27: first back-electromotive force prevention winding
30: second output winding
31: second back-electromotive force prevention winding
32: first armature
34: second armature
35: first rotor plate
37: first rotational permanent magnet
40: second rotor plate
42: second rotational permanent magnet
45: first fixed permanent magnet
50: second fixed permanent magnet
55: stator plate 60: driving shaft
65: stator cover
70-1, 70-2: bearings
75-1, 75-2: bearing support plates
80: first switch
85: second switch
90-1: first power supply
90-2: second power supply
95: base
105-1: first rectifier
105-1: second rectifier
110: capacitor
115-1, 115-2: spark absorbing capacitors
120: power MOS
125-1, 125-2: resistors
126-1, 126-2: resistors
130-1, 130-2: reverse current prevention diodes
200: generator
e1-1: first electromotive force
e2-1: second electromotive force
e2-2: second electromotive force generated on the second back-electromotive force prevention winding

BEST MODE FOR CARRYING OUT THE INVENTION

An embodiment of the present invention will be described with reference to the drawings. FIG. 1 is a constitutional diagram showing a generator of the present invention. In FIG. 1, a generator 200 comprises a stator plate 55 having a first fixed permanent magnet 45 having eight magnets on one side thereof and a second fixed permanent magnet 50 having as many magnets as eight on the other side, and the respective eight magnets of the first and second fixed permanent magnets are arranged in such a manner that magnetic poles facing each other thereof are opposite.

The generator 200 also comprises a first armature 32 and a second armature 34. The first armature 32 is provided on the side of the first fixed permanent magnet 45 and comprises a first switching winding 15 wound around a fixed first ring core 5, a first output winding 25 wound in the same direction on the first switching winding 15, a winding part and a gag part thereof being divided into four sections respectively, and a first back-electromotive force prevention winding 27 wound in the same direction on the gap part of the first output winding 25. The second armature 34 is provided on the side of the second fixed permanent magnet 50 and comprises a second switching winding 22 wound around a fixed second ring core 12, a second output winding 30 wound on the second switching winding 22 in the same direction a winding part and a gap part of which being divided similarly and opposite to the gap and winding parts of the first output winding 25 respectively, and, a second back-electromotive force prevention winding 31 wound in the same direction on the gap part of the second output winding 30.

The generator also comprises a first rotor plate 35 facing the first armature 32 and comprising a first rotational permanent magnet 37 having eight magnets and a second rotor plate 40 facing the second armature 34 and comprising a second rotational permanent magnet 42 having eight magnets, which are coupled to a driving shaft 60 each other. The opposite magnetic poles of the first rotational permanent magnet 37 and the second rotational permanent magnet 42 are arranged to be the same respectively. There is shown the case where the number of the fixed permanent magnets, the division number showing the total number of the winding sections and the gap sections of the output windings, and the number of the rotational permanent magnets are eight. The number may be an arbitrary number more than one if they are the same number.

The stator plate 55, the first armature 32 and the second armature 34 are fixed on a base 95 by a stator cover 65. The driving shaft 60 is supported by bearings 70-1 and 70-2 and fixed on the base 95 by bearing support plates 75-1 and 75-2. A first switch 80 connected with the first output winding 25 and a second switch 85 connected with the second output winding 30 are fixed to the driving shaft 60 and connected with power supplies 90-1 and 90-2 respectively. Next, the detailed constitution of the generator 200 is explained.

Figure 2:
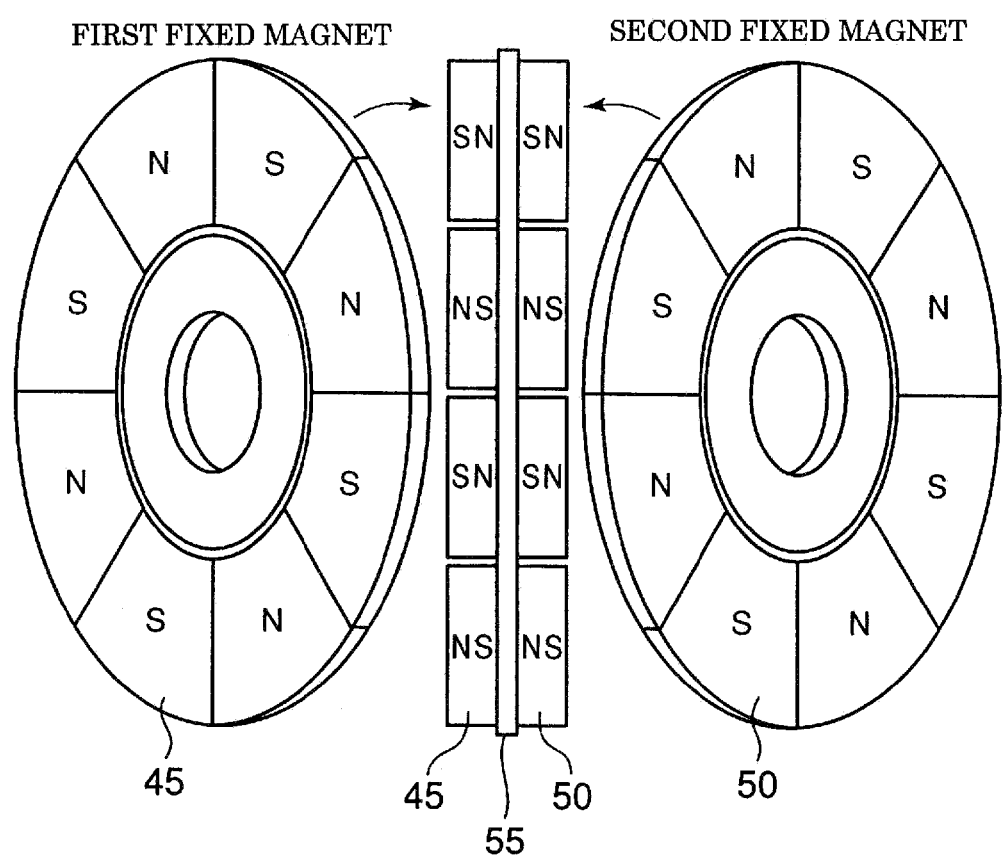
FIG. 2 is a stator plate constitutional diagram showing the constitution of a stator plate of the present invention.

FIG. 2 is a stator plate constitutional diagram showing the constitution of a stator plate of the present invention. The stator plate 55 comprises the first fixed permanent magnet 45 having eight magnets on one side and the second fixed permanent magnet 50 having eight magnets on the other side. The respective eight magnets of the first and second fixed permanent magnet are arranged in such a manner that magnetic poles facing each other thereof are opposite. The stator plate 55 is fixed on the base 95 by the stator cover 65.

Figure 3:
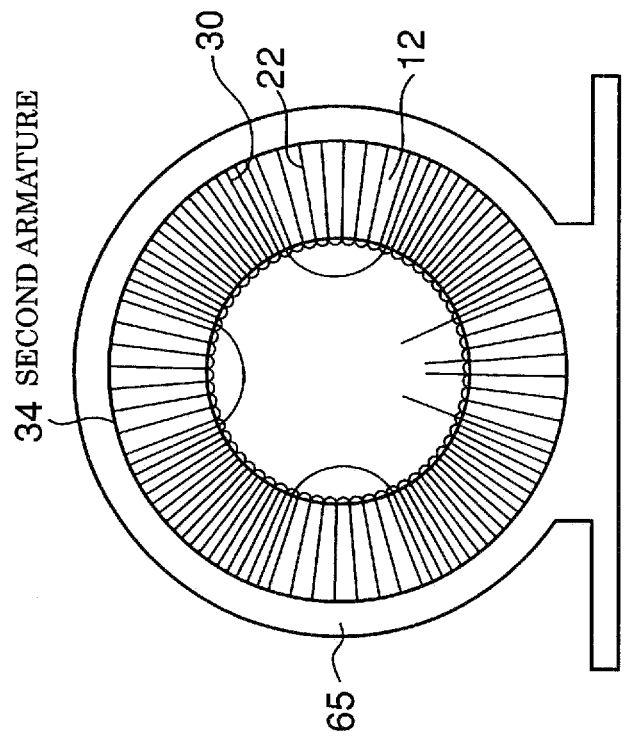
FIG. 3 is an assembly diagram showing the assembly of armatures and a stator cover of the present invention.
Figure 3:
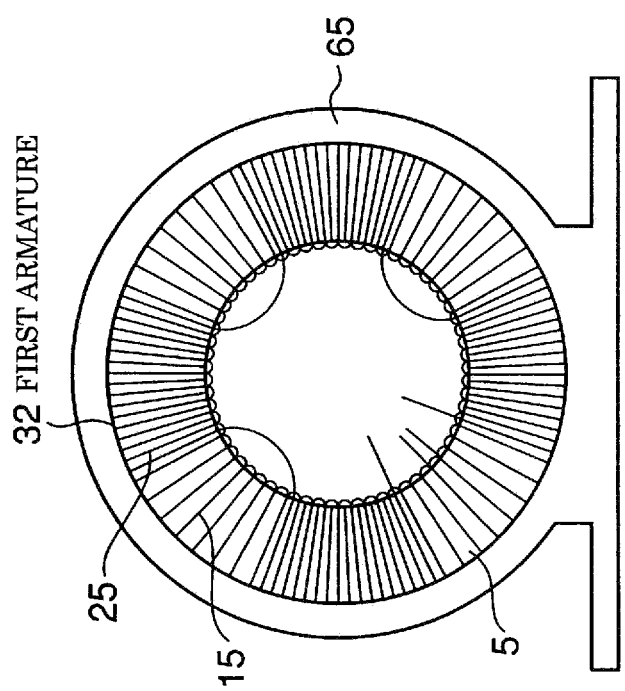

FIG. 3 is an assembly diagram showing the assembly of armatures and a fixed cover of the present invention. The first armature 32 and the second armature 34 are opposed to each other having the stator plate 55 (not shown) and fixed to the stator cover 65 fixed on the base 95.

FIGS. 4a, 4b and 4c are armature constitutional diagrams showing the constitution of ring cores and windings of the present invention. In FIG. 4a, the first switching winding 15 is wound around the first ring core 5 and the second switching winding 22 is wound around the second ring core 12. The first and second switching windings 15 and 22 are wound in the same direction and in the same predetermined winding number. The both ends of the first switching winding 15 are connected with the first power supply 90-1, the first switch 80, and a reverse current prevention diode 130-1 in series, which constitutes a closed circuit. The both ends of the second switching winding 22 are connected with the second power supply 90-2, the second switch 85, and a reverse current prevention diode 130-2 in series, which constitutes a closed circuit.

In FIG. 4b, the first output winding 25 is wound on the first switching winding 15 and the second output winding 30 is wound on the second switching winding 22 in the same direction as the switching windings 15 and 22 and in the predetermined winding number. The output windings 25 and 30 have winding parts and gap parts divided into four sections respectively, and the gap part of one is opposite to the winding part of the other. The center of each of the winding sections and gap sections is aligned with the contact part of each of the plurality of the fixed permanent magnets 45 and 50. The winding ends of high potential side of electromotive force inducted on the first output winding 25 and the second output winding 30 are connected with the anode terminals of a first rectifier 105-1 and second rectifier 105-2 respectively.

In FIG. 4c, the first back-electromotive force prevention winding 27 is wound on each of the gap sections of the first output winding 25 in the same direction as the first output winding 25 and in the predetermined winding number. The second back-electromotive force prevention winding 31 is wound on each of the gap sections of the second output winding 30 in the same direction as the second output winding 30 and in the predetermined winding number. One end (a starting end of winding) of the first back-electromotive force prevention winding 27 is connected with one end of a capacitor 112. One end (a starting end of winding) of the second back-electromotive force prevention winding 31 is connected with the other end of the capacitor 112. The other end (an ending end of winding) of the first back-electromotive force prevention winding 27 and the other end (an ending end of winding) of the second back-electromotive force prevention winding 31 are connected with each other.

Figure 5:
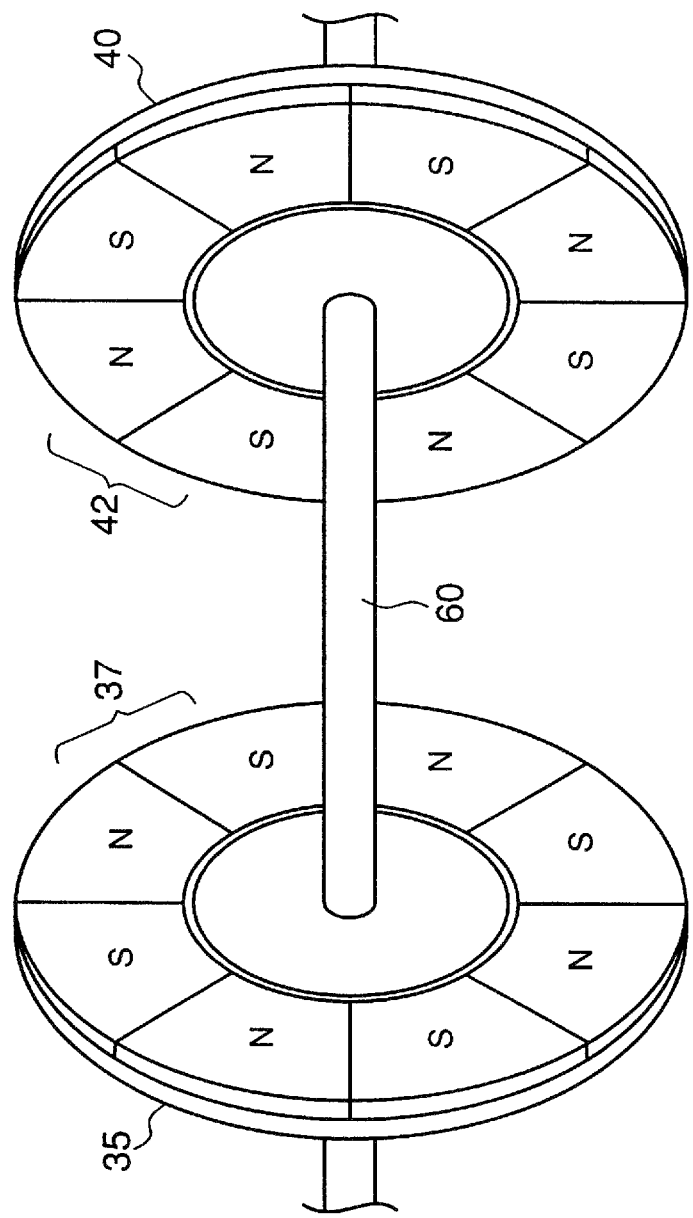
FIG. 5 is a rotor plate constitutional diagram showing the constitution of rotor plates of the present invention.

FIG. 5 is a rotor plate constitutional diagram showing the constitution of rotor plates of the present invention. In FIG. 5, the first rotor plate 35 comprising the first rotational permanent magnet 37 having eight magnets and the second rotor plate 40 comprising the second rotational permanent magnet 42 having eight magnets are connected with each other by the driving shaft 60 and opposite to the first armature 32 and the second armature 34 shown in FIG. 3 respectively. The first rotational permanent magnet 37 and the second rotational permanent magnet 42 are disposed in such a manner that the same pole of each of the magnets is opposite. The driving shaft 60 is supported by the bearings 70-1 and 70-2 and fixed on the base 95 by the bearing support plates 75-1 and 75-2 as shown in FIG. 1.

Figure 6:
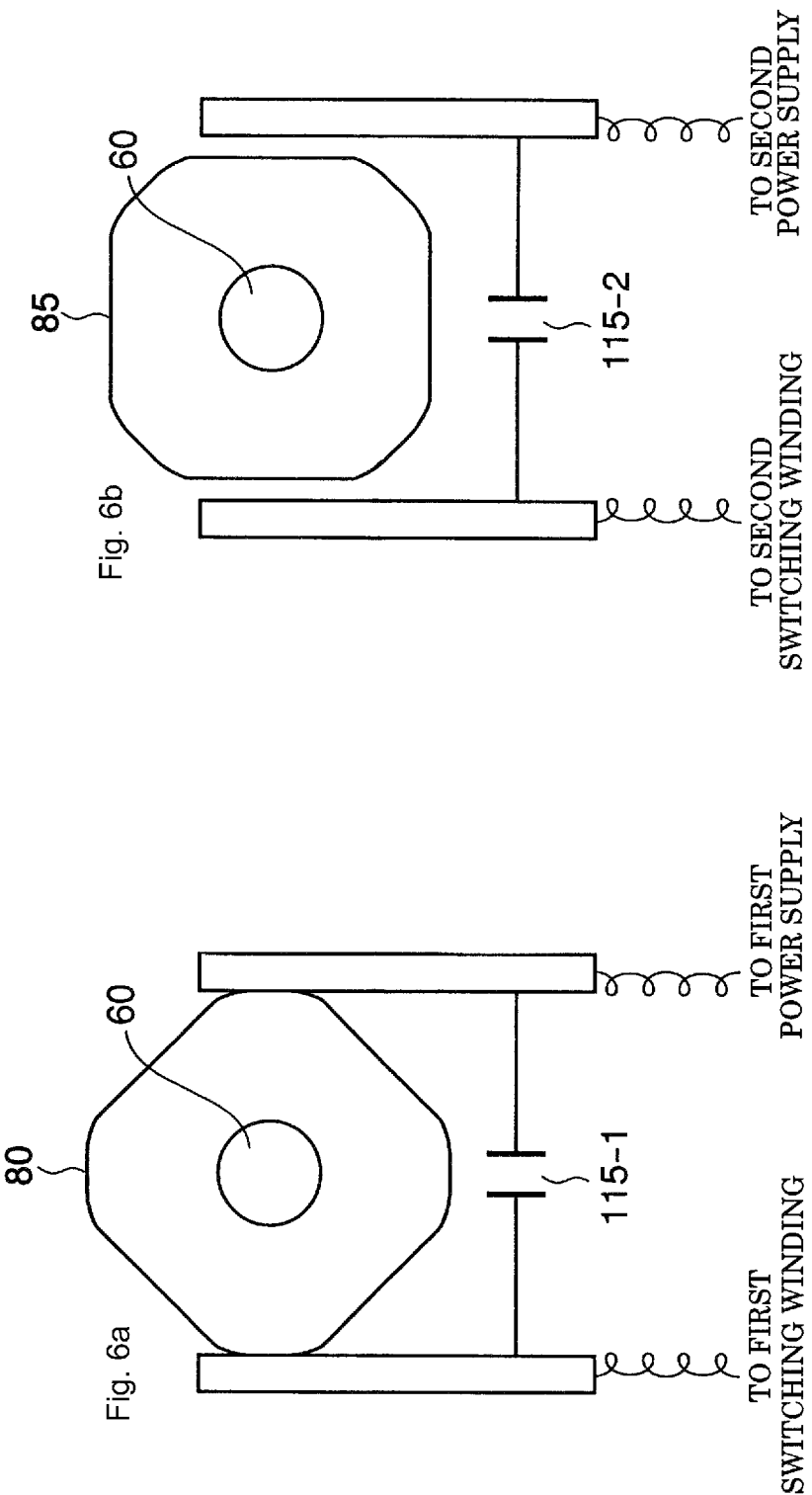
FIGS. 6a and 6b are connection diagrams showing the connection between rotary switches and a driving shaft.

FIGS. 6a and 6b are connection diagrams showing the connection between rotary switches and a driving shaft. In FIGS. 6a and 6b, the first switch 80 and the second switch 85 are rotary switches and connected with the driving shaft 60. Each of the rotary switches functions as the first switch 80 and the second switch 85. As shown in FIGS. 4a and 4b, the first switch 80 is connected with the first power supply 90-1 and the reverse current prevention diode 130-1 in series and constitutes the closed circuit with the first switching winding 15. In the same manner, the second switch 85 is connected with the second power supply 90-2 and the reverse current prevention diode 130-2 in series and constitutes a closed circuit with the second switching winding 22. Spark absorbing capacitors 115-1 and 115-2 are connected at between the terminals of the rotary switches respectively. The rotary switches are turned on/off in response to the rotation angle of the driving shaft 60.

FIGS. 7a and 7b are circuit connection wiring diagrams of electronic switches. The rotary switches of FIG. 6, mechanical switches, may be replaced with electronic switches, power MOS 120-1 and 120-2 respectively. In FIGS. 7a and 7b, outputs from a first and second hall sensors (not shown) detecting the rotation angle of the first and second rotor plates shown in FIG. 5 are input to the gates of the power MOS 120-1 and 120-2 respectively through resistors 125-1 and 125-2 and function as switching elements. The power MOS 120-1 and 120-2 are connected with the first power supply 90-1 and the second power supply 90-2, and the reverse current prevention diode 130-1 and the reverse current prevention diode 130-2 respectively in series, and constitutes closed circuits with the first switching winding 15 and the second switching winding 22. The spark absorbing capacitors 115-1 and 115-2 are connected at between the ends of the power MOS 120-1 and 120-2 and grounds.

Figure 8:
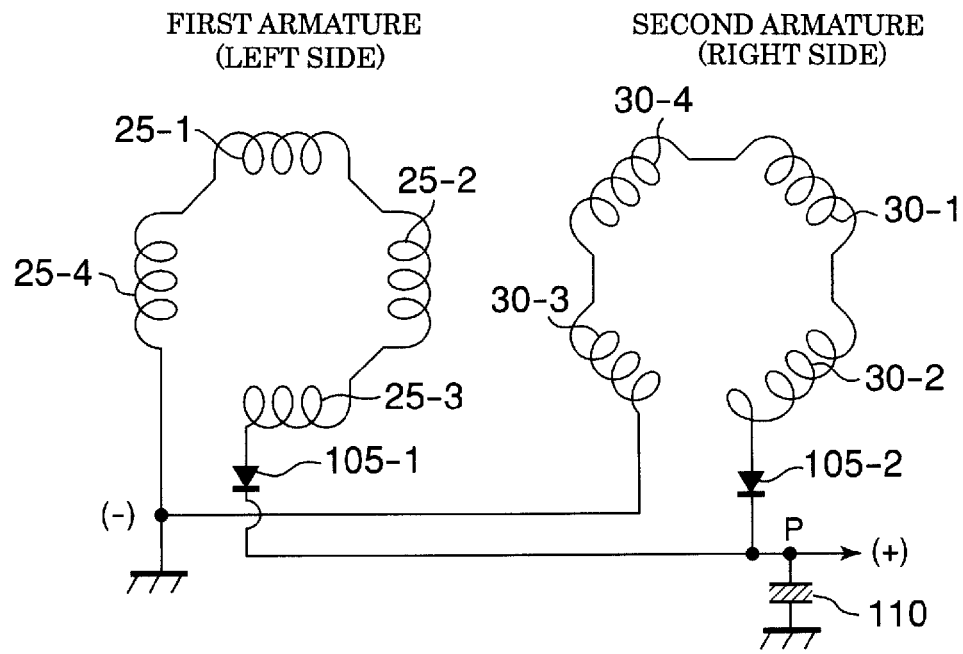
FIG. 8 is a circuit connection diagram showing the connection of output windings.

FIG. 8 is a circuit connection diagram showing the connection of output windings. In FIG. 8, one ends of the first and second output windings 25-1 to 25-4 and 30-1 to 30-4 each having four winding sections and gap sections are grounded, and the other ends are connected with the positive terminals of the first and second rectifiers 105-1 and 105-2. The negative terminals of the first and second rectifiers 105-1 and 105-2 are connected with one end of the capacitor 110 and the other end of the capacitor 110 is grounded. The capacitor 110 is charged by the electromotive force inducted on the first and second output windings 25 and 30 through the first and second rectifiers 105-1 and 105-2, and power is extracted. Next, the operation of the generator 200 is explained.

In FIG. 1, magnetic flux loops shown by dashed arrows are generated between the first rotational permanent magnet 37 and the first fixed permanent magnet 45 through the first ring core 5 when the first and second rotor plates 35 and 40 rotate and come to the position shown in FIG. 1 subsequent to start of a motor (not shown) connected with the driving shaft 60. Electromotive force is not inducted because the generated magnetic flux is canceled in the coil of the first output winding 25. In this positional relation between the second rotational permanent magnet 42 and the second fixed permanent magnet 50, the same poles are opposite. As shown by the dashed arrows, the generated magnetic flux passes through the coils of the second output winding 30 and the second back-electromotive force prevention winding 31 and second electromotive forces e2-1 and e2-2 are inducted respectively.

As the driving shaft 60 rotates further, the positional relation between the second rotational permanent magnet 42 and the second fixed permanent magnet 50 becomes more similar to that between the first rotational permanent magnet 37 and the first fixed permanent magnet 45. Thus, the generated magnetic flux is canceled in the coil of the second output winding 30 as similar to the above case, and electromotive force is not inducted. At this moment, a back-electromotive force which is equivalent and whose polarity is opposite to the second electromotive force e2 is inducted on the second output winding 30. The magnetic flux generated by the back-electromotive force affects the second rotational permanent magnet 42 of the second rotor plate 40 and becomes a brake to prevent the rotation of the second rotor plate 40. Due to this brake, the rotational driving force of the motor is weakened and electricity generation efficiency is lowered.

To prevent this from occurring, the second switch 85 constituting the circuit with the second switching winding 22 is turned on in response to rotational angle at which magnetic flux loop is generated, and current is supplied from the second power supply 90-2. The current is supplied in the same direction as current generated by electromotive force of an output winding when switching and output windings are wound in the same direction. If switching and output windings are wound in opposite directions, the current is supplied in the opposite direction. There is shown the case in which the winding numbers and directions of the first and second output windings 25 and 30 are the same, and the winding numbers and directions of the first and second switching windings 15 and 22 are also the same.

The magnetic field generated by the current supplied to the second switching winding 22 acts to negate the back-electromotive force generated on the second output winding 30. Therefore, the second switch 85 is adjusted to correspond to the rotational angle of the second rotor plate 40 so that the second switch 85 is turned on subsequent to the predetermined delay time and supplies current to negate the back-electromotive force based on the timing of the generated electromotive force. In this way, weakening of the rotational driving force of the motor due to the back-electromotive force is prevented and electricity generation efficiency is improved.

Further, as shown in FIG. 1, the direction of the magnetic flux passing through the second back-electromotive force prevention winding 31 is opposite to that of the magnetic flux passing through the second output winding 30. Thus, the second electromotive force e2-2 inducted on the second back-electromotive force prevention winding 31 charges the capacitor 112 in the state of the opposite polarity to the second electromotive force e2-1 inducted on the second output winding 30. At the time when back-electromotive force which is equivalent and whose polarity is opposite to the second electromotive force e2-1 is inducted on the second output winding 30, the current charged to the capacitor 112 flows out to the second back-electromotive force prevention winding 31, generates magnetic field and acts to negate the back-electromotive force generated on the second output winding 30. At the same time, in the same manner, electromotive force is inducted on the first output winding 25 by the magnetic field generated by the current flowing in the first back-electromotive force prevention winding 27. However, this electromotive force does not appear on the output because it has the opposite polarity and therefore is blocked by the first rectifier 105-1. In this way, lowering of the output voltage by the back-electromotive force is further resolved and electricity generation efficiency is greatly improved.

As the driving shaft 60 rotates further, the positional relation between the first rotational permanent magnet 37 and the first fixed permanent magnet 45 becomes the same as that between the second rotational permanent magnet and the second fixed permanent magnet 50. In the same manner as the second rotational permanent magnet 42, the generated magnetic flux of the first rotational permanent magnet 37 passes through the coil of the first output winding 25 and the first electromotive force e1-1 is inducted on the first output winding 25 of the first armature 32. Back-electromotive force in this case is also processed as well.

During the process that the driving shaft 60 rotates and the positional relation between the second rotational permanent magnet 42 and the second fixed permanent magnet 50 changes to that between the first rotational permanent magnet 37 and the first fixed permanent magnet 45, the positional relation between the second rotational permanent magnet 42 and the second fixed permanent magnet 50, whose mutually facing magnetic poles have been the same, is deviated. The generated magnetic flux of the second rotational permanent magnet 42 is attracted strongly to the opposite pole of the second fixed permanent magnet 50 through the second ring core 12. Due to the motor effect caused thereby, rotational driving force is generated and the rotational driving force of the driving shaft 60 is enhanced. Consequently, the original rotational driving force by the motor is enhanced, and electricity generation efficiency is further improved. In this case, in the relationship between the first rotational permanent magnet 37 and the first fixed permanent magnet 45, the loop of the magnetic flux is changed to pass through the coil of the first output winding 25 and acts to generate electromotive force. Therefore, repulsion force is not generated between the first rotational permanent magnet 37 and the first fixed permanent magnet 45, and the rotational force is free of adverse effects.

Figure 9:
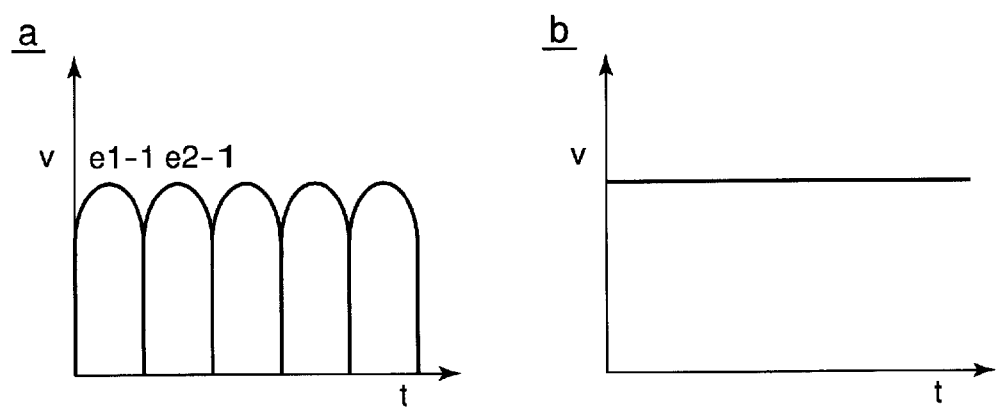
FIGS. 9a and 9b are output waveform diagrams showing the output waveform of an electric generator of the present invention.
Figure 11:
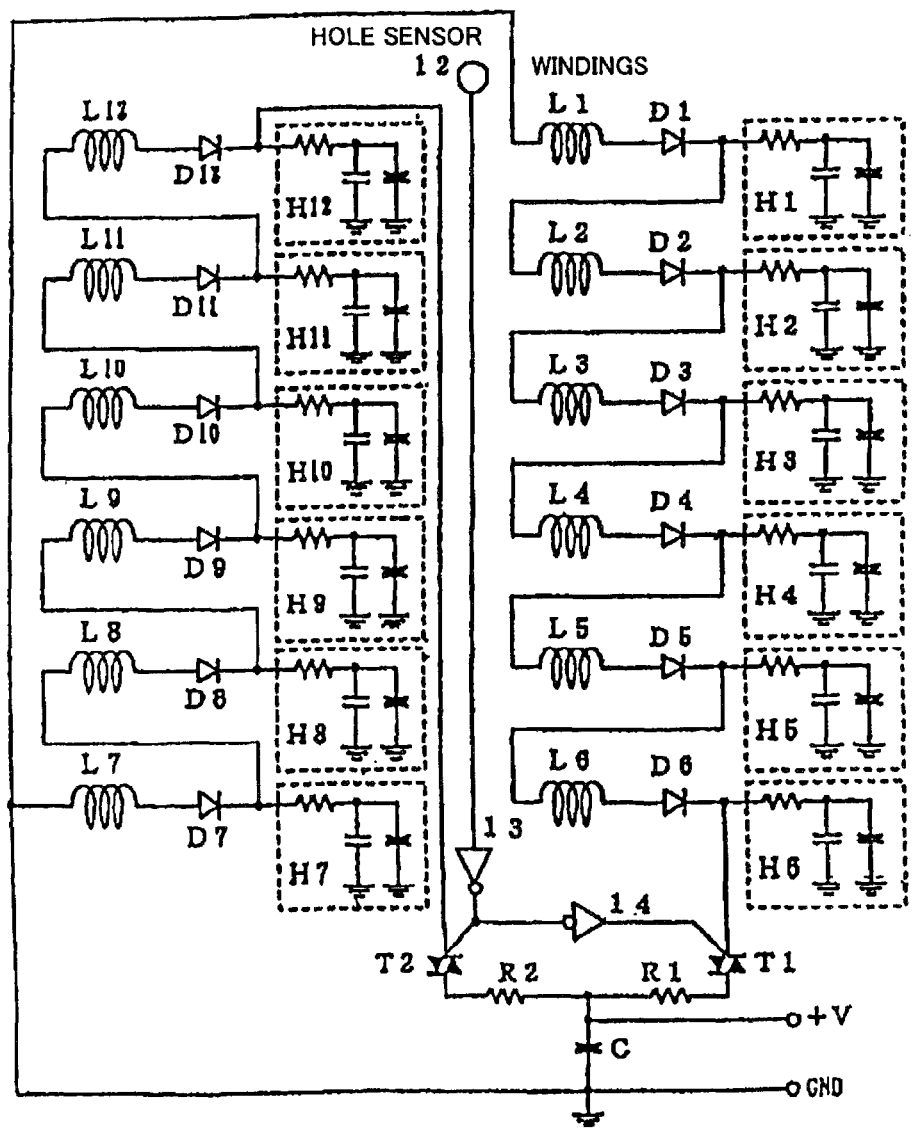
FIG. 11 is a circuit diagram showing the electronic connection of the conventional electric power generating apparatus.

FIGS. 9a and 9b are output waveform diagrams showing the output waveform of an electric generator of the present invention. In FIG. 9a, the first electromotive force e1-1 and the second electromotive force e2-1 are output alternately to point P shown in FIG. 8 at the phase difference of 90 degrees, and charged to the capacitor 110. FIG. 9b shows the output voltage of the electromotive force charged to the capacitor 110 and smoothed.

As described above, according to the present invention, electromotive forces generated by two independently divided power generation mechanisms prevent the rotational brake effect of back-electromotive force by each of the switching windings and back-electromotive force prevention windings. Also, the electromotive forces are output in such a manner that the phases thereof are completely shifted, and the rotational driving force by motor effect are generated alternately in the two independently divided power generation mechanisms, which can enhance the rotation of the rotor plates. In this way, there can be provided a generator, the power generation efficiency of which is further improved.

The invention claimed is:

1. A generator comprising:
a stator plate having a first fixed permanent magnet consisting of a plural number of magnets arranged so that mutually adjacent magnets have opposite polarities on one side thereof and a second fixed permanent magnet consisting of the same number of magnets as the plural number arranged similarly on the other side, the respective plural number of magnets of the first and second fixed permanent magnet being arranged in such a manner that magnetic poles facing each other thereof are opposite;
a first armature provided on the side of the first fixed permanent magnet, comprising a first switching winding wholly wound around a first ring core fixed thereto, a first output winding, and a first back-electromotive force prevention winding, the first output winding being wound on the first switching winding and including a winding part and a gap part divided into winding sections and gap sections respectively so that the total number of the winding and gap sections are the same as the plural number, each center of the winding and gap sections being aligned with each of contact parts at which the plural number of magnets of the first fixed permanent magnet are in contact with each other, the first back-electromotive force prevention winding being wound on the gap part of the first output winding;
a second armature provided on the side of the second fixed permanent magnet, comprising a second switching winding wholly wound around a second ring core fixed thereto, a second output winding, and a second back-electromotive force prevention winding, the second output winding being wound on the second switching winding and including a winding part and a gap part divided into winding sections and gap sections respectively so that the total number of the winding and gap sections are the same as the plural number, the winding part and gap part of the second output winding being opposite to the gap part and winding part of the first output winding respectively, each center of the winding sections and gap sections being aligned with each of contact parts at which the plural number of magnets of the second fixed permanent magnet are in contact with each other, the second back-electromotive force prevention winding being wound on the gap part of the second output winding;
a first rotor plate facing the first armature and having a first rotational permanent magnet consisting of the same number of magnets as the plural number arranged so that mutually adjacent magnets have opposite polarities; and
a second rotor plate facing the second armature and having a second rotational permanent magnet consisting of the same number of magnets as the plural number, the magnets being arranged so that magnetic poles thereof facing those of the first rotational permanent magnet are the same, the first and second rotor plates being coupled to each other by a driving shaft;
wherein the first and second switching windings comprise first and second power supplies and first and second switches respectively;
wherein one end of the first back-electromotive force prevention winding is connected with one end of a capacitor, one end of the second back-electromotive force prevention winding is connected with the other end of the capacitor, the other end of the first back-electromotive force prevention winding and the other end of the second back-electromotive force prevention winding are connected with each other; and wherein electromotive force is extracted by operations of the first and second switches based on the timing when the electromotive force is generated on the first and second output windings by rotation of the first and second rotor plates.

2. The generator according to claim 1, wherein winding directions of the first and second output windings and the first and second back-electromotive force prevention windings are the same, the numbers of windings of the first and second output windings are the same, the numbers of windings of the first and second back-electromotive force prevention windings are the same, and the numbers of windings and winding directions of the first and second switching windings are the same.

3. The generator according to claim 2, wherein when the winding directions of the first and second output windings and the first and second switching windings are the same, the first and second switches are turned on based on the timing when an electromotive force is generated on the first and second output windings, and the first and second power supplies supply a current in the same direction as a current generated by the electromotive force, and when the winding directions of the first and second output windings and the first and second switching windings are opposite, the first and second switches are turned on based on the timing when an electromotive force is generated on the first and second output windings, and the first and second power supplies supply a current in the opposite direction to a current generated by the electromotive force.

4. The generator according to claim 3, wherein one ends of the first and second output windings are grounded and the other ends thereof are connected with positive terminals of first and second rectifiers, negative terminals of the first and second rectifiers are connected with one end of the capacitor, the other end of the capacitor is grounded, and electricity is extracted from the one end of the capacitor.

5. The generator according to claim 1, wherein when the winding directions of the first and second output windings and the first and second switching windings are the same, the first and second switches are turned on based on the timing when an electromotive force is generated on the first and second output windings, and the first and second power supplies supply a current in the same direction as a current generated by the electromotive force, and when the winding directions of the first and second output windings and the first and second switching windings are opposite, the first and second switches are turned on based on the timing when an electromotive force is generated on the first and second output windings, and the first and second power supplies supply a current in the opposite direction to a current generated by the electromotive force.

6. The generator according to claim 5, wherein one ends of the first and second output windings are grounded and the other ends thereof are connected with positive terminals of first and second rectifiers, negative terminals of the first and second rectifiers are connected with one end of the capacitor, the other end of the capacitor is grounded, and electricity is extracted from the one end of the capacitor.

7. The generator according to claim 2, wherein one ends of the first and second output windings are grounded and the other ends thereof are connected with positive terminals of first and second rectifiers, negative terminals of the first and second rectifiers are connected with one end of the capacitor, the other end of the capacitor is grounded, and electricity is extracted from the one end of the capacitor.

8. The generator according to claim 1, wherein one ends of the first and second output windings are grounded and the other ends thereof are connected with positive terminals of first and second rectifiers, negative terminals of the first and second rectifiers are connected with one end of the capacitor, the other end of the capacitor is grounded, and electricity is extracted from the one end of the capacitor.

* * * * *